Figure 3:
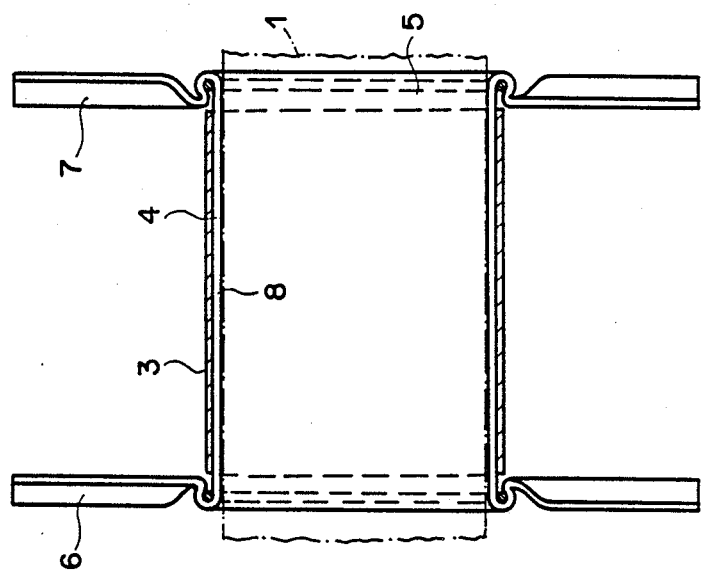

United States Patent [19]

Kühler

[11] Patent Number: 4,921,355
[45] Date of Patent: May 1, 1990

[54] HEATING AND COOLING ARRANGEMENT PARTICULARLY FOR AN EXTRUSION CYLINDER

[75] Inventor: Paul Kühler, Bassersdorf, Switzerland

[73] Assignee: Gruter Elektroapparate AG., Switzerland

[21] Appl. No.: 75,916

[22] PCT Filed: Nov. 5, 1986

[86] PCT No.: PCT/CH86/00154
§ 371 Date: Jun. 30, 1987
§ 102(e) Date: Jun. 30, 1987

[87] PCT Pub. No.: WO87/02617
PCT Pub. Date: May 7, 1987

[30] Foreign Application Priority Data
Nov. 5, 1985 [CH] Switzerland .................... 4743/85

[51] Int. Cl.$^5$ .................... B29C 47/82; B01F 7/08; B01F 15/06; F28F 1/30
[52] U.S. Cl. .................... 366/146; 165/181; 366/79
[58] Field of Search .............. 366/144, 145, 146, 79, 366/147, 80, 81, 82, 87, 88, 89, 90; 165/61, 181, 182, 64; 219/538, 535, 544, 548, 549, 547; 425/143, 144, 378.1, 378.2, 379.1, 207, 208, 209

[56] References Cited
U.S. PATENT DOCUMENTS 3,285,329 11/1966 Finn ........................... 165/61
3,317,958 5/1967 Stroup et al. .................. 165/64
3,730,262 5/1973 Drugmand ..................... 165/46
3,743,252 7/1973 Schott, Jr. ................... 366/147 X
3,872,281 3/1975 Krieg et al. ................... 219/535
4,187,905 2/1980 Isenberg ....................... 165/181
4,236,578 12/1980 Kreith et al. .................. 165/181
4,292,503 9/1981 Brent ........................... 219/535

FOREIGN PATENT DOCUMENTS 2642572 3/1978 Fed. Rep. of Germany ...... 165/181
1163860 9/1969 United Kingdom ............... 219/535

Primary Examiner—Philip R. Coe
Assistant Examiner—Scott J. Haugland
Attorney, Agent, or Firm—Townsend and Townsend

[57] ABSTRACT

The heating and cooling arrangement (3, 4) for an extrusion cylinder comprises a copper strip (4) bent aside at right angles at its ends (6, 7) and twisted by 45°, the middle portion (8) of which rests upon the extrusion cylinder (1) as well as a band-shaped flexible heating element (3) disposed over the middle portion (8). The cooling elements (4) are disposed on a cylinder section (b 5) at regular intervals over the whole periphery thereof. Two copper wires led through the end regions (9, 10) of the middle portions (8) of the cooling elements (4) fasten the same to the surface of the extrusion cylinder (1). The heating element has two outer metal sheets (15, 16), an insulating layer (17) lying therebetween, as well as heating wires (18). This heating and cooling arrangement can be disposed on as many sections of the extrusion cylinder (1) as desired and makes possible an individual cooling or heating of each section of the cylinder, which fact is important for very rapid extrusion processes. An optimum adaptation of the temperature profile along the extrusion cylinder to any extrusion process individually is made possible.

3 Claims, 3 Drawing Sheets

U.S. Patent   May 1, 1990   Sheet 1 of 3   4,921,355
FIG. 1
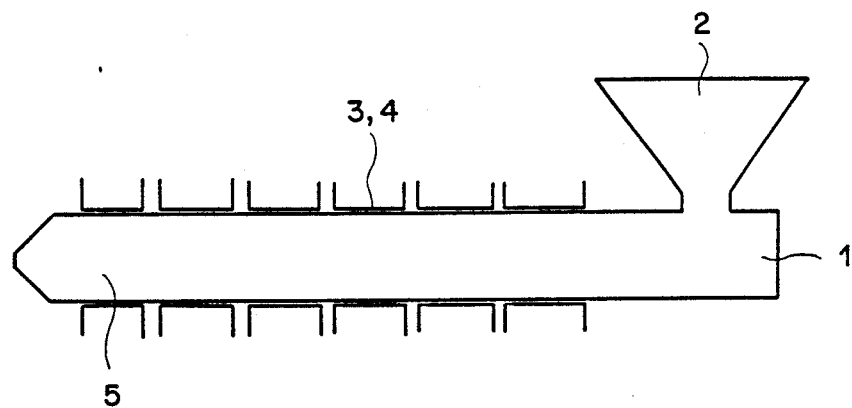
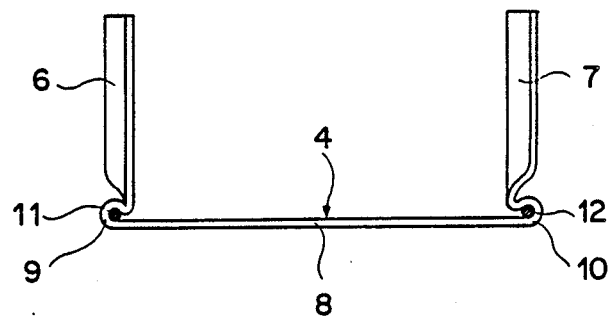
FIG. 2A
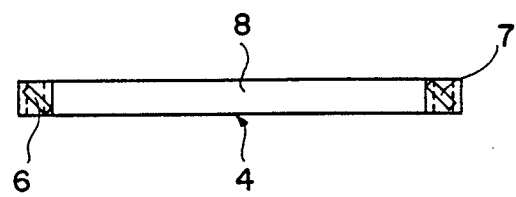
FIG. 2B

HEATING AND COOLING ARRANGEMENT PARTICULARLY FOR AN EXTRUSION CYLINDER

This invention relates to a heating and cooling arrangement for an extrusion cylinder, as well as to an extrusion cylinder with at least one heating and cooling arrangement.

In plastic-extrusion machines, it is important for the extrusion process that the whole extrusion cylinder can be heated or cooled. It is known, for heating an extrusion cylinder, to provide for a casting with integrally cast heating at the periphery thereof. This arrangement has the disadvantage that it has a great time lag as regards heating and cooling and does not make possible any individual heating and cooling of a cylinder section.

The heating and cooling unit according to U.S. Pat. No. 3,730,262 has the disadvantage that it comprises a rigid pipe which cannot well be adapted with optimum heat trasnfer to an extrusion cylinder. The result is poor heat distribution since air for cooling is conducted over a pipe around the extrusion cylinder. The heat distribution is not homogenous over the surface of the cylinder.

The device for increasing the heat exchange according to U.S. Pat. No. 4,236,578 has no heating elements. The heating elements would have to be disposed next to the cooling elements. Thus, at a specific location of the pipe, merely heating or cooling can take place. The arrangement according to this disclosure is likewise not flexible and cannot be optimally adpated to a given cylinder. With the rigid design according to this patent and the one mentioned above, a small space is possibly produced between jacket and tube, and this makes the heat transfer much poorer. Very precise machining of the jacket is necessary in order to ensure good heat transfer. The conduction of heat would not be ensured, for instance, if the heating elements were disposed under the cooling elements since the heating wires must be insulated.

The air-cooled extruder according to U.S. Pat. No. 3,743,252 likewise has the disadvantage that the cooling arrangement is not flexible. The cooling plates must be very precisely machined.

The heating and cooling unit for extruders according to U.S. Pat. No. 3,285,329 yields the same problems as the device according to U.S. Pat. No. 3,730,262. The device is likewise rigid, which makes optimum adaptation to the extruder pipe impossible. Good heat transfer is not ensured. The air cooling with pipes also results in poor heat distribution on the surface of the cylinder.

It is a task of the present invention to provide a heating and cooling arrangement by means of which individual cylinder sections can be both cooled and heated. The heating and cooling arrangement should be able to be adapted in a simple manner to any desired diameter of the extrusion cylinder.

This is achieved, according to the invention, by means of at least one cooling element and at least one heating element, the arrangement being formed flexible.

Furthermore, it should be possible to bring about an optimum adaptation of the temperature profile along the extrusion cylinder to each extrusion process individually.

This is achieved in an extrusion cylinder with a heating-cooling arrangement according to the invention in that in each case on one section of the extrusion cylinder, at least on a great part of its periphery, cooling elements are fastened, and at least one heating element is provided over the cooling elements on the surface of the extrusion cylinder. By means of the arrangement according to the invention, the temperature profile can be adapted to the respective process speed. A dynamic heating and cooling system is provided, which is also suitable for very rapid extrusion processes. The heating-up and cooling processes take place much more quickly than with the rigid arrangements of the prior art.

An embodiment of the invention, as well as its use, is described in detail below with the aid of the appended drawing.

Figure 5:
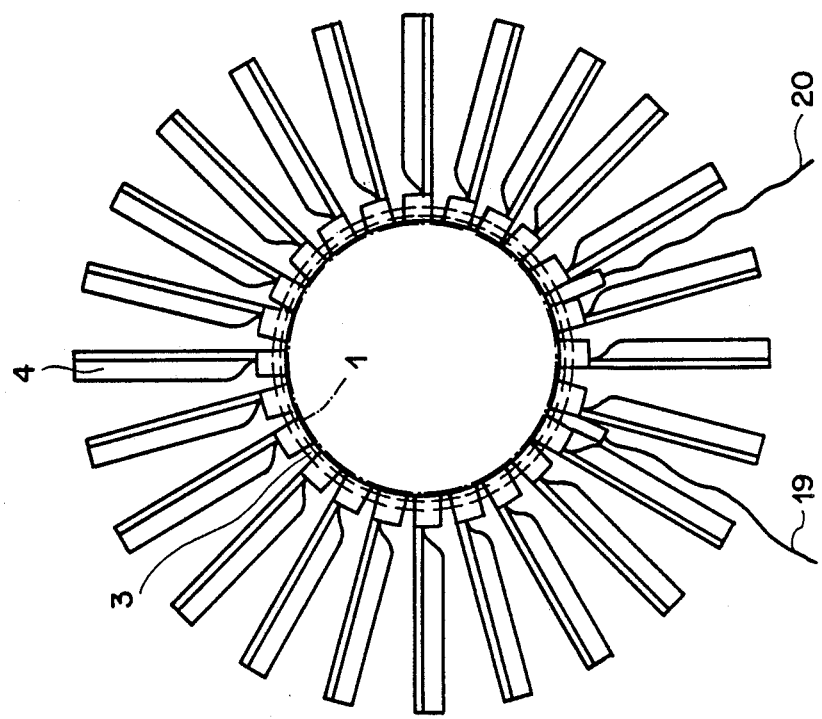
Figure 4:
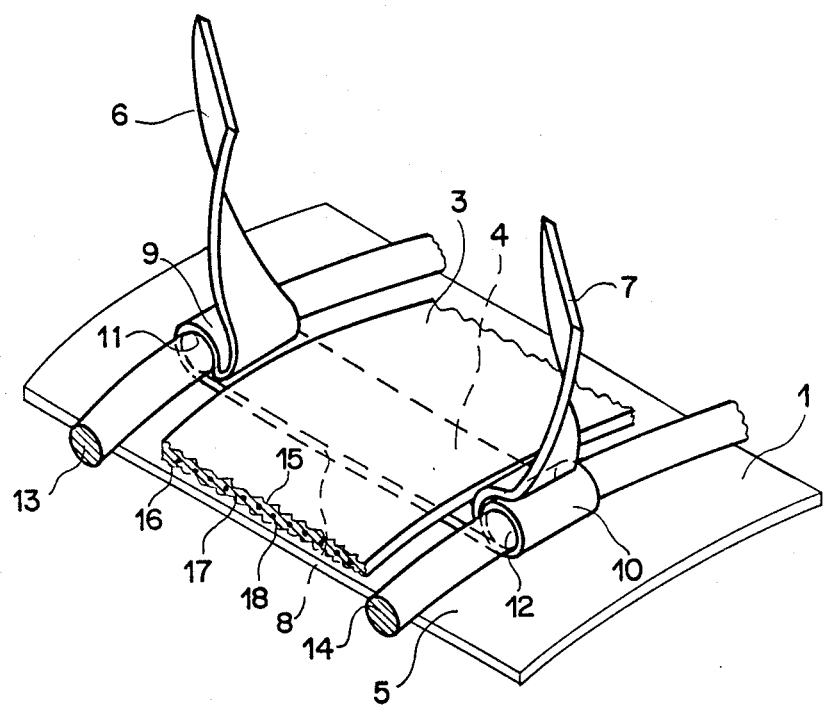

FIG. 1 shows a schematic representation of an extruder with heating and cooling elements provided thereon, FIG. 2A shows a section of a cooling element and FIG. 2B shows a top plan view of the cooling element, FIG. 3 shows a section through a heating and cooling arrangement provided on the extrusion cylinder, FIG. 4 shows a perspective view of a heating and cooling arrangement mounted on the extrusion cylinder, FIG. 5 shows a view of the extrusion cylinder with cooling elements and a heating element disposed on its entire periphery.

In FIG. 1, the extrusion cylinder 1 with a hopper 2 is depicted schematically. On the periphery of the extrusion cylinder 1, heating and cooling arrangements 3 and 4 are provided at regular, preferably small intervals. On a single section 5 of the extrusion cylinder 1, in each case several cooling elements distributed at regular, preferably small intervals over the whole periphery of the cylinder, as well as a band-shaped heating element, are provided.

In FIG. 2, a cooling element 4 is depicted in section (FIG. 2A) and in top plan view (FIG. 2B). The cooling element 4 is made from one piece, the ends being bent aside at right angles to the middle portion 8 as legs 6 and 7 and also twisted by 45° in the direction of their longitudinal axis for mechanical stabilization. In the transition regions 9 and 10 from the middle portion 8 to the legs 6 and 7, the cooling element 4 has one bent section 11 and 12 each. The cooling element is preferably made of copper, a metal having good heat conductivity. The cooling element likewise has low heat-retention, which fact is important in the case of a rapid succession of heating and cooling operations of the extrusion cylinder.

FIG. 3 shows a section through a heating and cooling arrangement provided on the extrusion cylinder 1, wherein, of the cooling elements disposed on a section 5 of the extrusion cylinder, radially on the whole periphery thereof, two elements offset by 180° relative to one another, as well as the band-shaped heating element 3, are visible. The heating element is a good heat insulator and has low heat-retention.

In FIG. 4, the heating and cooling arrangement 3, 4 is depicted in perspective. The cooling elements 4, consisting of copper strips forming an angle at their ends, are held by two copper wires 13 and 14 on the surface of the extrusion cylinder 1. The copper wires 13 and 14 are led through the bent sections 11 and 12 formed in the end regions 9 and 10 of the middle portion 8 of the cooling element. All of the cooling elements 4 disposed over the whole periphery of a section 5 of the extrusion cylinder are fastened by the copper wires 13 and 14. The heating element 3 laid over the individual cooling elements 4 is formed in the shape of a band. It comprises two outer metal sheets 15 and 16, between which an insulating material 17 is provided. Disposed within the high-temperature-resistant insulating material 17 are heating wires 18. The heating element 3 can be fastened to the extrusion cylinder 1 by screws, which also makes possible easy exchanging thereof since the heating element is exposed to greater wear and tear than the cooling element. The heating element is so formed and mounted on the extrusion cylinder that as few flow losses as possible occur during cooling.

FIG. 5 shows a view of the extrusion cylinder 1 with cooling elements 4 disposed over the whole periphery thereof, forming a band, as well as the band-shaped heating element 3. Two connection wires 19 and 20 for the heating element 3 are led from the surface of the extrusion cylinder 1 outward. The cooling air is blown radially onto the extrusion cylinder and flows axially away.

The number of cooling and/or heating zones can be varied as need be. Through the ranging side by side of single, identical cooling elements, the arrangement can be adapted to any desired diameter of the extrusion cylinder.

Instead of the cooling elements joined in the shape of a band, several extruded cooling elements might also be used.

The described arrangement has proved to be an effective means of ensuring the adaptation of an extrusion cylinder in operation to any desired temperature profile. Each heating and cooling arrangement formed of a number of cooling elements and a heating element provides for the maintenance of a predetermined temperature at the location where it is affixed around the cylinder. Both the cooling elements and the heating elements have a low heat-retaining value. The heating elements, which act toward the outside as heat insulators, lie over the copper strips of the cooling elements and thus cause the heat to penetrate directly into the cylinder as a result of the direct contact between the heating elements, the copper strips, and the cylinder. If cooling is to be brought about, the respective heating element is switched off. The heat of the cylinder is then transferred to the outside air by the legs 6 and 7 of the cooling elements through radiation and convection.

As in the customary installations, an axially acting fan is set up at the end of the cylinder, which provides for the air circulation.

I claim:

1. A heating and cooling arrangement for use with a cylinder, such as an extrusion cylinder, the cylinder having a periphery, comprising:
   at least one flexible cooling element, the cooling element having a middle portion and end regions bent away from the periphery of the cylinder such that there is a transition region disposed between the middle portion and each end region, each transition region being bent back toward the middle portion, forming C-shaped bent sections;
   at least one flexible heating element; and
   the cooling element flexibly conforming to the periphery of the cylinder and the heating element being disposed over the middle portion of the cooling element.

2. A heating and cooling arrangement according to claim 1, further having a wire passing through each C-shaped bent section.

3. A heating and cooling arrangement according to claim 2, having a plurality of cooling elements disposed around the cylinder while being connected together with the wires.

* * * * *